United States Patent Office 3,304,342
Patented Feb. 14, 1967

3,304,342
OXIDATIVE DEHYDROGENATION OF MONOOLEFINS
George J. Nolan and Vernon C. F. Holm, Bartlesville, Okla., assignors to Phillips Petroleum Company, a corporation of Delaware
No Drawing. Filed Dec. 27, 1965, Ser. No. 516,740
4 Claims. (Cl. 260—680)

This invention relates to an oxidative dehydrogenation process. In one aspect it relates to an oxidative dehydrogenation of monoolefins. In another aspect it relates to oxidatively dehydrogenating monoolefins over a catalyst comprising aluminum phosphate.

Conjugated diolefins such as 1,3-butadiene and isoprene are widely used in the manufacture of synthetic rubber. These diolefins are usually made by dehydrogenation of the corresponding monoolefins, that is, the butenes and the isopentenes. Since these olefin feed stocks are relatively expensive, and since the synthetic rubber business is highly competitive, a search is constantly being made for ways to increase the efficiency of the olefin dehydrogenation step, thereby improving the overall efficiency of the synthetic rubber manufacture.

In the search for more efficient dehydrogenation processes, oxidative dehydrogenation has been extensively investigated because in theory it permits more extensive dehydrogenation at lower operating temperatures and by reaction of the oxygen with the hydrogen removed from the olefin to form water, furnishes at least part of the heat required for dehydrogenation reaction. However, one problem with oxidative dehydrogenation is that the oxygen present in such processes tends to react with the olefin being dehydrogenated with a consequent lowering of dehydrogenation efficiency. In addition, cracking presents a serious problem in oxidative dehydrogenation processes with a lowering of the hydrogenation efficiency.

Aluminum phosphate catalyst systems have been known in the prior art. However, they generally have been used in cracking processes as aluminum phosphate is a good cracking catalyst. In addition, they have been known to be useful in isomerization reactions. It has now been surprisingly discovered that at high temperatures this same catalyst possesses good selectivity for dehydrogenating alkenes in an oxidative dehydrogenation system. It is extremely surprising that a catalyst which is known in the art as a cracking catalyst could show selectivity for dehydrogenation in an oxidative dehydrogenation process which normally increases the tendency for cracking to occur. The prior art teachings just did not visualize the concept of employing an aluminum phosphate catalyst in an oxidative dehydrogenation system for improving the overall efficiency of said dehydrogenation reaction.

Therefore, it is an object of this invention to provide an improvement in oxidative dehydrogenation reactions.

It is another object of this invention to employ a catalyst comprising aluminum phosphate for improving the conversion of butene-2 to butadiene.

Other objects and many of the attended advantages of this invention will be readily appreciated as the same becomes better understood by reference to the following detailed description.

According to this invention, alkenes such as n-butene, n-pentene, isopentenes, octenes, decenes, including alkyl-substituted and unsubstituted cycloalkenes such as cyclopentene, cyclohexene, 3 - butylcyclohexene, 3 - isopentyl-cyclopentene and the like are oxidatively dehydrogenated over an aluminum phosphate catalyst.

The catalyst of this invention is particularly useful in the formation of 1,3-butadiene from butenes, 1,3-pentadiene from pentenes, and isoprene from the 2-methyl-butenes.

The aluminum phosphate catalyst can be used either in the form of granules, or in the form of mechanically-formed pellets, or with a supporting or diluting material such as alumina present. The supported or diluted catalyst can be prepared by any of the means known to the industry, such as dry or wet milling, impregnation, and the like.

One preferred means of forming the supported aluminum phosphate catalyst comprises simply ball milling together the desired amounts of finely divided aluminum phosphate and finely divided alumina for sufficient time to effect intimate mixing, and forming the mixture into pellets by means known to the industry.

The operating conditions for this invention can vary widely but will generally include a temperature from about 800 to about 1300° F., preferably from about 900 to about 1200° F., a pressure from about 0.05 to about 50 p.s.i.a., preferably from about 0.1 to about 25 p.s.i.a., and an oxygen to gaseous hydrocarbon volume ratio from about 0.1:1 to about 3:1, preferably from about 0.5:1 to about 2:1. The hydrocarbon space rate (volumes of hydrocarbon vapor per volume of catalyst per hour, 32° F., 15 p.s.i.a.) can be from about 50 to about 5000, preferably from about 100 to about 2500.

The oxygen can be employed as such or with an inert diluent such as nitrogen and the like. Desirable oxygen-containing gases include air, flue gases containing residual oxygen and the like. The presence of oxygen during the dehydrogenation reaction permits the use of long operating periods. However, when catalyst regeneration is required, it can be effected simply by terminating olefin flow for a short period and continuing the flow of oxygen-containing gas at the same of higher rate. Dehydrogenation is resumed simply by starting olefin flow once again.

The process of this invention is ordinarily carried out by forming a mixture, preferably preheated, of the hydrocarbon and oxygen or oxygen-containing stream and passing this mixture over the catalyst at the desired temperature and rate. Recycle of unconverted hydrocarbon can be employed if desired; however, the conversion rate and selectivity of this invention are generally sufficiently high to justfy a single step, i.e., single pass operation, if, for example, the product streams can be used without separation steps in a subsequent operation such as a polymerization, isomerization or the like.

*Example I*

Aluminum phosphate was obtained from the J. T. Baker Chemical Company, and was used in the form of 20 to 28 mesh granules to dehydrogenate butene-2 at a temperature of 1100° F., atmospheric pressure, a butene-2 space rate of 100 v./v./hr., an air space rate of 500 v./v./hr., and an oxygen to olefin ratio of 1/1, with the following results.

Time in run, minutes _____ 44
Olefin conversion, mol percent _____ 47.4
Butadiene yield:
    Per-pass _____ 37.6
    Ultimate _____ 79.3

By reference to the above example, it is very clear that at high temperatures aluminum phosphate has very low cracking activity, but on the other hand exhibits properties that are useful in selective oxidative dehydrogenation of the 2-butene to butadiene. In this reaction there is little or no fouling of the surface by catalytic deposits.

*Example II*

Butene-2 was dehydrogenated under the same conditions used in Example I, using 20–28 mesh granules of a commercial calcium phosphate-nickel phosphate dehydrogenation catalyst having the following composition on a weight percent basis:

| | |
|---|---|
| $Ni_3PO_4$ | 10.4 |
| $Ca_3(PO_4)_2$ | 88.7 |
| $Cr_2O_3$ | 0.9 | with the following results:

| | Time in Run, minutes | | |
|---|---|---|---|
| | 10 | 54 | 44 (interpolated) |
| Olefin Conversion, mol percent | 85.38 | 36.08 | 47.5 |
| Butadiene Yield: | | | |
| Per-pass | 2.69 | 16.27 | 13.2 |
| Ultimate | 3.15 | 45.09 | 27.8 |

It is apparent that this catalyst is very much less efficient than the catalyst of the invention; the ultimate yield of butadiene at the same time and conversion level being only about 27.8 percent compared with 79.3 percent for the catalyst of the invention.

Obviously many modifications and variations of the present invention are possible in the light of the above teachings. It is therefore to be understood that within the scope of the appended claims the invention may be practiced otherwise than is specifically described herein.

We claim:
1. A method for dehydrogenating at least one compound selected from the group consisting of alkenes and the alkyl-substituted and unsubstituted cycloalkenes, said method comprising the step of contacting said compound in the presence of oxygen with a catalyst comprising aluminum phosphate at a temperature ranging from 800 to about 1300° F.

2. A method according to claim 1 wherein the compound is selected from the group consisting of alkenes and cycloalkenes containing from 4 to 10 carbon atoms per molecule, said method comprising the step of contacting said compound in the presence of an oxygen-containing gas containing sufficient oxygen to effect a dehydrogenation in the presence of a catalyst comprising granules of aluminum phosphate.

3. A method according to claim 2 wherein the temperature is in the range of from 900 to about 1200° F. and the oxygen to olefin volume ratio ranges from 0.1:1 to about 3:1.

4. A process according to claim 3 further characterized in that butene-2 is dehydrogenated to butadiene.

No references cited.

DELBERT E. GANTZ, *Primary Examiner.*

G. E. SCHMITKONS, *Assistant Examiner.*